United States Patent [19]

Hayward

[11] 4,051,711
[45] Oct. 4, 1977

[54] CALIBRATION APPARATUS FOR GAS FLOWMETERS

[75] Inventor: Alan Thomas Joseph Hayward, East Kilbride, Scotland

[73] Assignee: Secretary of State for Industry in Her Britannic Majesty's Government of the United Kingdom of Great Britain and Northern Ireland, London, England

[21] Appl. No.: 740,019

[22] Filed: Nov. 8, 1976

[30] Foreign Application Priority Data

Nov. 12, 1975 United Kingdom ............... 46783/75

[51] Int. Cl.² ............................................. G01F 25/00
[52] U.S. Cl. .......................................................... 73/3
[58] Field of Search ............................ 73/3; 15/104.06

[56] References Cited

U.S. PATENT DOCUMENTS

| 3,041,204 | 6/1962 | Green | 15/104.06 R |
| 3,295,357 | 1/1967 | Halpine et al. | 73/3 |

FOREIGN PATENT DOCUMENTS

| 1,420,754 | 1/1976 | United Kingdom | 73/3 |

Primary Examiner—S. Clement Swisher
Attorney, Agent, or Firm—Cushman, Darby & Cushman

[57] ABSTRACT

A mechanical displacement meter prover has a displacer which is devised to facilitate operation with gas flows. The displacer comprises a pair of longitudinally spaced, transverse sealing members, such as a pair of inflated elastomer spheroids, between which is a reservoir of lubricating fluid. Each sealing member is exposed to the fluid as the displacer travels through the prover, the fluid acting both to lubricate the displacer and to assist in sealing the displacer against the propelling gas flow.

12 Claims, 4 Drawing Figures

GAS FLOW LINE

CALIBRATION APPARATUS FOR GAS FLOWMETERS

This invention relates to apparatus for calibrating gas flowmeters and falls within a class of calibration apparatus commonly known as mechanical displacement meter provers.

Mechanical displacement meter provers for liquid flowmeters are well known and widely used, particularly in the petroleum industry where their relative cheapness, combined with high repeatability and ease and rapidity of use, makes them applicable to large capacity flowmeters such as those required for large pipeline, tanker and barge metering operations. Meter-provers of this type generally comprise a length of ordinary steel pipe, coated with a resinous paint on the inside and fitted with two detectors spaced apart along the length of the pipe. A displacer, which may take the form of a hydrostatically inflated elastomer spheroid with a nominal diameter slightly larger than that of the pipe into which it is forced, or a cylindrical piston fitted with cup seals at each end, is caused to travel through the pipe by the flowing liquid; a spherical displacer has the advantage that it can negotiate bends in the pipe and consequently the pipe can be conveniently folded into a compact shape. The volume of the length of pipe between the two detectors, which length is known as the prover section, is determined from a previous calibration, and the detectors enable the time for this volume to be swept out by the displacer to be measured electronically, or alternatively for a reading of total quantity displaced to be recorded at the flowmeter during the exact interval in which the displacer is travelling between the two detectors. By comparing the readings obtained from the meter prover and from the flowmeter on test, which is installed in series with the meter prover, the flowmeter can be calibrated.

This calibration technique, effective as it is with liquid flows, cannot be readily applied to gas flows because two contributing factors provided by the liquid in the system are essential to efficient operation. Firstly, the liquid lubricates the displacer thereby assisting its smooth passage through the pipe, and secondly, the incompressible nature of the liquid compels the displacer to move steadily with the liquid flow. If an attempt is made to apply the technique to gas flows, the unlubricated displacer tends to stick in the pipe. Furthermore, if the displacer is a spheroid it has to be inflated until there is about a 2 percent interference fit between it and the pipe in order to obtain a good seal, with the result that the spheroid wedges tightly in the pipe. Then, when gas pressure is applied to one side of the spheroid it remains stationary until sufficient pressure has built up to overcome the static friction between it and the pipe, whereupon it starts moving. As soon as this occurs, due to the fact that the dynamic friction which now exists between the spheroid and the pipe is less than the static friction which existed formerly, the spheroid travels down the pipe at high speed, overshoots the point at which the friction force is in balance with the pressure differential across it, and may subsequently come to rest, after which the whole cycle is repeated, thus causing the spheroid to travel forward in a series of jerks.

The only forms of mechanical displacement meter prover which have previously been known to work successfully with gases are those in which the coated pipe is replaced by a straight cylinder whose bore has been honed, and in which the displacer is a piston of special design with seals having very low friction characteristics. Although one or two prototypes of this design have been operated successfully it has never been used widely in industrial practice because of its high cost, added to which there is the possible disadvantage that unless much attention is paid to maintenance the seals of the piston may start to leak.

The present invention therefore seeks to provide a mechanical displacement meter prover in which a suitably lubricated displacer can be smoothly transported by gas flows through inexpensive coated pipe as commonly used in liquid flowmeter provers.

Accordingly, the invention resides in a mechanical displacement meter prover for gas flowmeters comprising a pipe and a displacer movable along the pipe in response to the flow of gas through the pipe, the pipe having a prover section provided at each end with a detector reactive to the transit of the displacer, and the displacer comprising a pair of longitudinally spaced, transverse sealing members between which there exists a reservoir of lubricating fluid to which fluid each of the sealing members is exposed in use of the prover.

The presence of the lubricating fluid, which fluid is preferably a viscous oil, reduces the frictional force between the sealing members and the inside of the pipe and thereby aids the smooth transport of the displacer through the pipe. It also acts as an efficient seal against the gas so that it is not essential for either of the sealing members to alone completely seal against gas by mechanical contact with the inside of the pipe. Consequently the sealing members need not be nipped so tightly in the pipe as a single unlubricated spheroid or piston would have to be if it had to act as the only seal against gas and this reduction in the extent to which the sealing members need to be nipped enables a further valuable reduction in friction to be obtained.

Preferably the space within the pipe between the two sealing members is substantially entirely filled with lubricating fluid and the sealing members are capable of movement towards each other to compensate for losses of lubricating fluid from that space. In this way the sealing members can be continuously and completely lubricated and only when the sealing members have approached each other to be almost touching is it necessary to replenish the reservoir. Consequently, by initially spacing the two members sufficiently well apart to allow a substantial quantity of fluid to be included between them, the frequency of replenishment can be reduced to a low level. The sealing members in such an embodiment may be in the form of two separate inflated elastomer spheres or spheroids. An advantage of this is that the pipe need not be straight and can be folded into a compact form. Alternatively if a straight pipe is used, the sealing members may be in the form of two separate cylindrical pistons, or the displacer may comprise a single piston with two seals one of which is capable of rolling or sliding towards the other to compensate for losses from the fluid reservoir between them.

It is also possible for the displacer to comprise a piston having two fixed seals although this may require that the lubricating fluid reservoir be replenished frequently if the seals are to be sufficiently well lubricated at all times. As an alternative to frequent replenishment an inflatable bag may be disposed in the space within the pipe between the seals, the remainder of the space being substantially entirely filled with lubricating fluid and the interior of the bag communicating with the gaseous environment upstream or downstream of the displacer. In this arrangement the bag will expand to compensate for losses of lubricating fluid and thereby maintain adequate lubrication of the seals.

Preferably the meter prover comprises means for removing from the pipe lubricating fluid which escapes from the reservoir in use of the prover; means for introducing lubricating fluid to the reservoir when the displacer is located within the pipe; and means for removing any gas which may become trapped in the reservoir, when the displacer is located within the pipe.

The invention will now be more particularly described, by way of example, with reference to the accompanying schematic drawings, in which.

Figure 1:
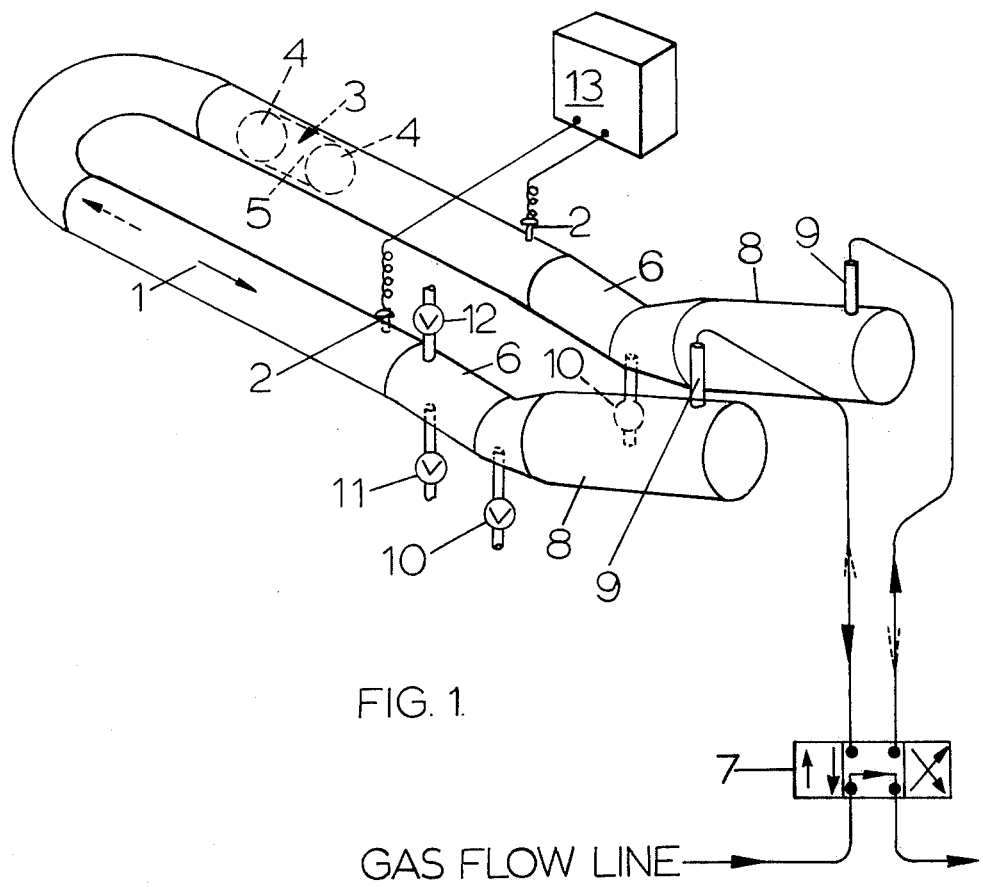
FIG. 1 illustrates an embodiment of a gas flowmeter prover according to the invention which is operable in an analagous manner to a conventional bi-directional folded type of liquid flowmeter prover.

The meter prover illustrated in FIG. 1 comprises a length of coated steel pipe 1 of the type commonly used in liquid flowmeter provers, which is folded into a U-shape and held in an almost horizontal plane, the U-bend being slightly higher than the ends. At each end of the pipe length 1 there is mounted a detector switch 2, the volume of the length of pipe between the switches 2 being accurately known and this length constituting the prover section of the apparatus. Continuous with each end of the pipe length 1, and inclined slightly downwards therefrom, is a length of continuation pipe 6 of identical bore to that of length 1. At their other ends, the continuation pipes 6 join with respective end chambers 8 each comprising a length of pipe having a larger bore than that of the pipes 1 and 6. The free ends of the chambers 8 are closed and the chambers are inclined upwards from pipes 6 at an angle of about 45° to the horizontal.

Movable within the above-described pipes is a displacer 3 which comprises two longitudinally spaced transverse sealing members in the form of separate inflated elastomer spheres or spheroids 4, the space between which is normally completely filled with a quantity of lubricating oil 5. Gas flows can be directed to pass through the pipes 8, 6 and 1 in either direction to move the displacer, via ports 9 and under the control of a valve 7.

At the commencement of a test run in either direction the displacer is positioned in the continuation pipe 6 which is upstream of the prover section in the chosen sense of direction, and valve 7 is operated to direct the gas flow through the apparatus. The displacer is accelerated out of the pipe 6 by the gas flow and into the prover section, as the foremost member 4 passes the first detector switch 2 the switch being activated to initiate operation of an electronic counter 13. The counter continues to operate while the displacer traverses the prover section and is stopped by the second detector switch 2 as the foremost member 4 passes out of the prover section into the downstream continuation pipe 6. The control valve 7 is also automatically operated upon activation of the second detector switch to cut off the gas supply to the apparatus, and the displacer then normally comes to rest within the length of the downstream continuation pipe 6. It is noted here that it is important for accuracy of operation that the detector switches are activated by only one and the same one of the two sealing members in any test run, and a simple logic circuit is included in the switching circuitry to ensure this. Also, it is considered that errors arising from the closing together of the sealing members as they move through the prover section, (see below), can be minimised if the switches are activated by the sealing member which is foremost in the direction of travel.

Figure 2:
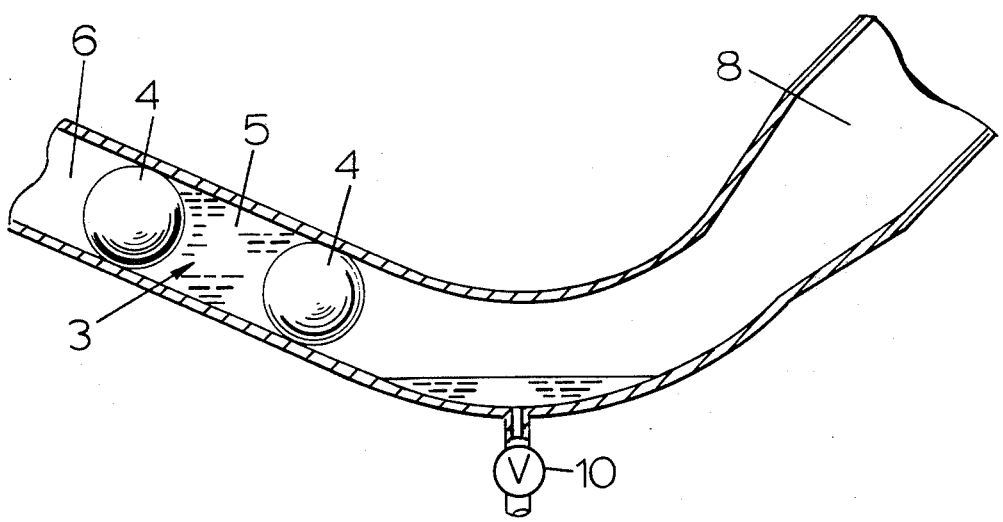
FIG. 2 illustrates in section means for removing escaped lubricating fluid from the apparatus of FIG. 1.

Throughout the transit of the displacer 3 through the pipes 1 and 6 oil gradually escapes from the reservoir between the sealing members to provide continuous lubrication for the displacer and to ensure that there is an efficient gas seal between the members 4 and the inside surfaces of the pipes. As oil is lost, (predominantly past the sealing member which is hindmost in the direction of travel), the sealing members automatically move closer together, the space between them remaining filled with oil although gradually decreasing in volume. The oil which escapes eventually collects at the lowest points in continuation pipes 6 as indicated in FIG. 2, whence it can be removed from time to time via drain taps 10 and then piped to a small gas separator for extraction of any dissolved gas before re-use.

Figure 3:
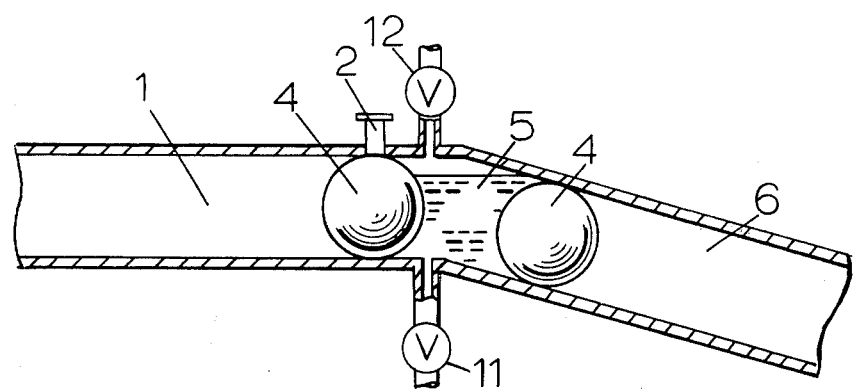
FIG. 3 illustrates in section means for replenishing the lubricating fluid reservoir and for removing gas from the lubricating fluid reservoir in the apparatus of FIG. 1.

The oil reservoir can be replenished when required by means of an oil inlet valve 11 as indicated in FIG. 3. At the same pipe section there is also provided a gas outlet valve 12 through which any gas which may become trapped between the members 4 can be removed. Such gas can also be piped to the gas separator to ensure the removal of any oil contamination before disposal. To assist the release of trapped gas from the displacer the valve 12 is sited at or near to the highest point of one of the continuation pipes 6; (an alternative site would be at the U-bend of the pipe length 1). Before replenishing the reservoir the sealing members 4 must first be positioned to provide coincidence between the reservoir and the valves 11 and 12, eg by suitable manipulation of the control valve 7. Correct positioning of the sealing members is indicated to the operator by means of the detector switch 2 when the member which is further from the adjacent end chamber 8 is within the detection region of the switch.

Figure 4:
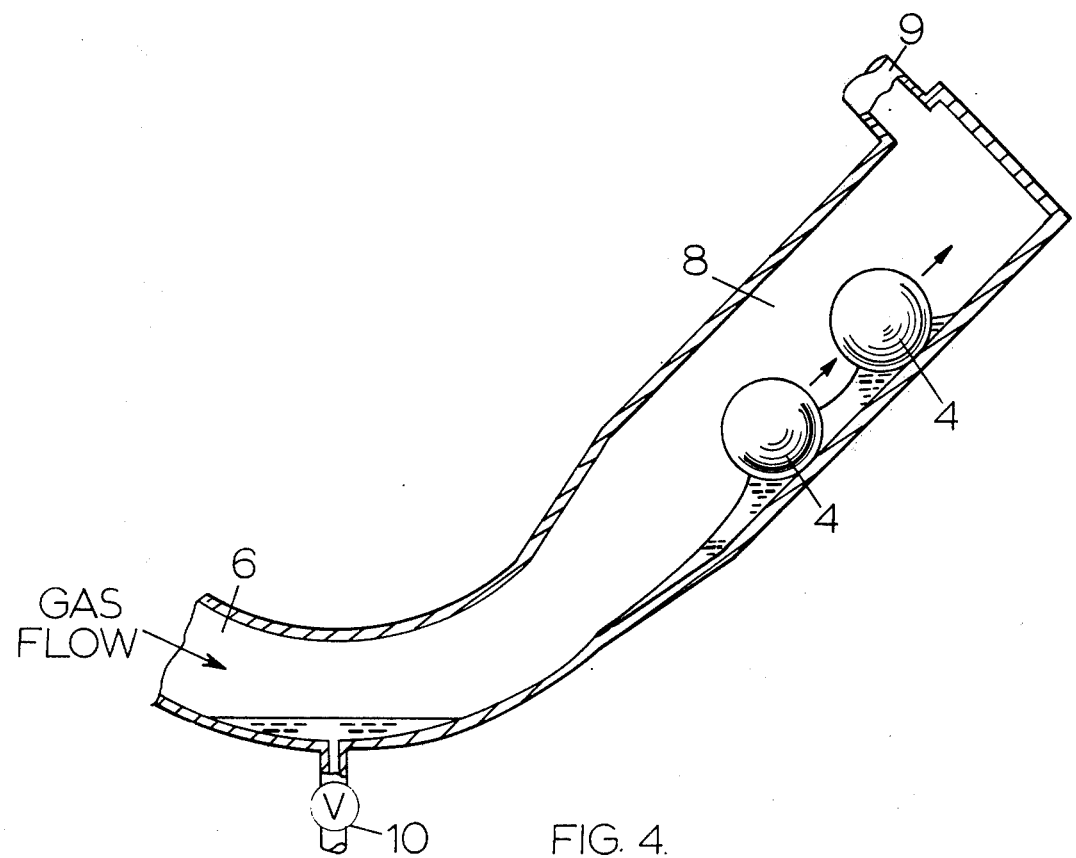
FIG. 4 illustrates in section an end chamber of the apparatus of FIG. 1.

If, for any reason, at the end of a test run in either direction the displacer should fail to come to rest within the length of the appropriate continuation pipe 6 it will enter the adjacent inclined end chamber 8 as indicated in FIG. 4. As soon as the displacer encounters the increased bore of the end chamber the gas by which it has been propelled can escape past the displacer and exit through the port 9, the displacer thereafter being gravitationally retarded by virtue of the inclination of the chamber. The length of each chamber 8 will be so chosen that the displacer will be able to come to rest before hitting the closed end of the chamber even if it enters at the maximum operational velocity. No harm can thus be done to the displacer by overrunning the pipe 6, although much of the oil will escape from between the sealing members and this will necessitate removing the lost oil via the adjacent drain tap 10 and re-injecting it through the valve 11 after repositioning the members 4 in the appropriate continuation pipe 6.

I claim:

1. A mechanical displacement meter prover for gas flowmeters comprising a pipe and a displacer movable along the pipe in response to the flow of gas through the pipe, the pipe having a prover section provided at each end with a detector reactive to the transit of the displacer, and the displacer comprising a pair of longitudinally spaced, transverse sealing members between which there exists a reservoir of lubricating fluid to which fluid each of the sealing members is exposed in use of the prover.

2. A meter prover according to claim 1 wherein in use the space within said pipe between the two sealing members is substantially entirely filled with lubricating fluid and said sealing members are capable of movement towards each other to compensate for losses of lubricating fluid from said space.

3. A meter prover according to claim 2 wherein the sealing members are in the form of two separate inflated elastomer spherical members.

4. A meter prover according to claim 3 wherein said pipe is folded into a U-shape.

5. A meter prover according to claim 1 comprising means for the removal from said pipe of lubricating fluid which escapes from said reservoir in use of the prover.

6. A meter prover according to claim 5 comprising a lubricating fluid drain tap opening from said pipe at a section thereof outside and at a lower level than the prover section.

7. A meter prover according to claim 1 comprising means for introducing lubricating fluid to said reservoir when the displacer is located within the pipe.

8. A meter prover according to claim 7 comprising a lubricating fluid inlet valve opening into said pipe at a section thereof outside the prover section.

9. A meter prover according to claim 1 comprising means for removing trapped gas from said reservoir when the displacer is located within the pipe.

10. A meter prover according to claim 8 comprising a gas outlet valve opening from said pipe at a section thereof outside the prover section.

11. A meter prover according to claim 10 wherein said inlet and outlet valves are provided at the same section of the pipe.

12. A meter prover according to claim 11 wherein said inlet and outlet valves are provided at a section of the pipe adjacent to one of said detectors.

* * * * *